Sept. 4, 1956 C. M. WESTFALL 2,761,954
APPARATUS FOR WELDING
Filed Oct. 14, 1953 2 Sheets-Sheet 1

Inventor:
Clifford M. Westfall,
By Schroeder, Merriam,
Hofgren & Brady, Attys.

Sept. 4, 1956 C. M. WESTFALL 2,761,954
APPARATUS FOR WELDING
Filed Oct. 14, 1953 2 Sheets-Sheet 2
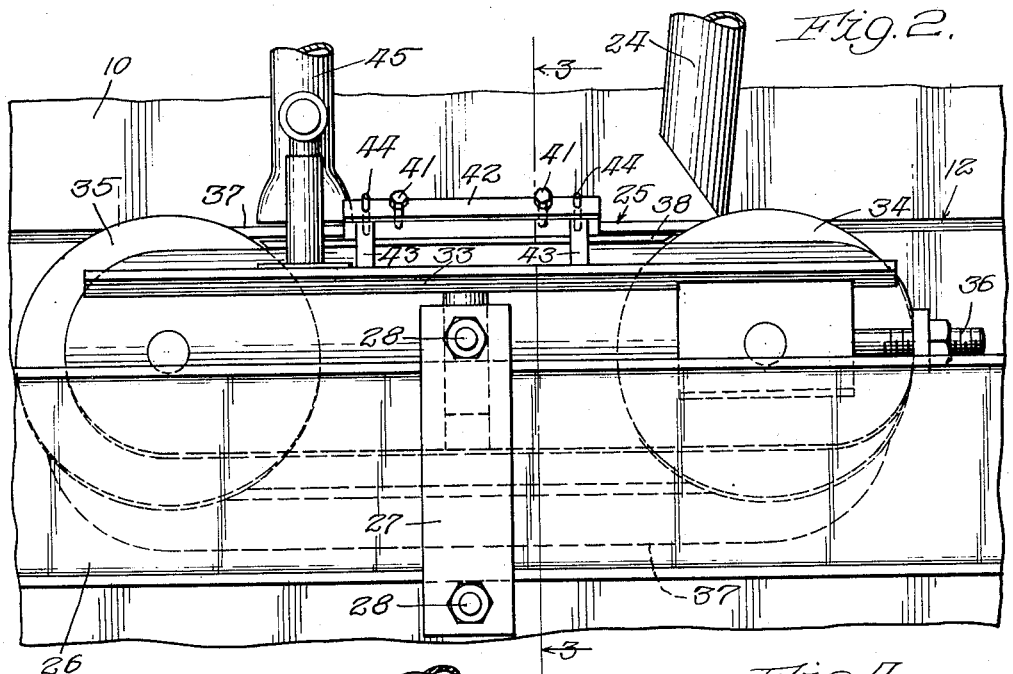
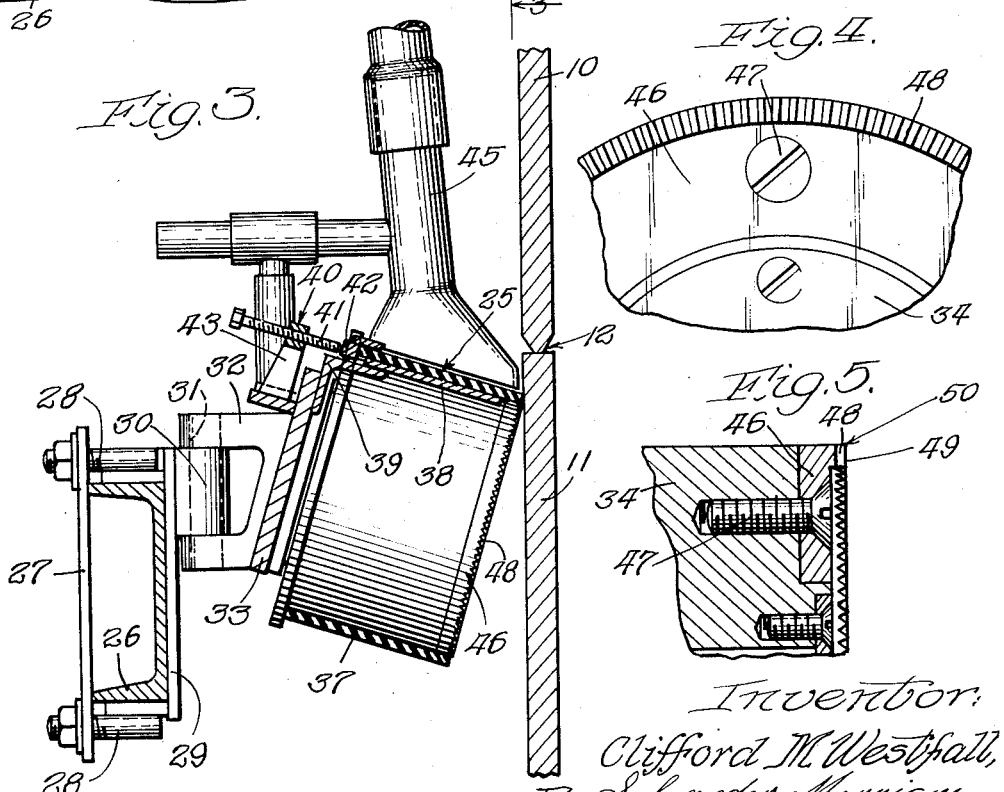
Inventor:
Clifford M. Westfall,
By Schroeder Merriam,
Hofgren & Brady, Attys.

United States Patent Office 2,761,954
Patented Sept. 4, 1956

2,761,954
APPARATUS FOR WELDING

Clifford M. Westfall, Homewood, Ill., assignor to Chicago Bridge & Iron Company, a corporation of Illinois Application October 14, 1953, Serial No. 385,956

6 Claims. (Cl. 219—126)

This invention relates to welding horizontal joints between upright plates and more particularly to the method and apparatus for retaining granular flux motionless with relation to the joint being welded by a submerged arc.

Submerged arc welding of horizontal joints in which the welding wire extends through the flux to the joint so that the arc is submerged in the flux is relatively new. There is a problem of retaining the molten metal at the joint against its natural tendency to flow by gravity out of the joint before it has an opportunity to freeze in proper position. Any movement of a bed or layer of granular flux material with relation to the plates forming a horizontal joint may shift the position of the weld metal or allow the metal to flow out of the joint before it has solidified a sufficient amount, thus causing porosity, cracks and pipes in the weld bead. The occurrence of such faults may require that all the weld metal in the area of the fault be removed from the joint and a suitable repair by depositing new weld metal be made to complete the welded joint.

The present invention is primarily concerned with a method and apparatus for holding the bed of flux against the joint to be welded by the submerged arc so that the bed or layer does not move in relation to that joint. This is of particular importance when welding a long horizontal joint such as the girth joint of a liquid storage tank. For welding such seams it has been proposed to use a machine which travels upon the upper edge of a vertical plate temporarily positioned on other vertical shell plates to be joined along its lower horizontal edge by welding. Such a machine has a head carried opposite the lower edge of the plate. Thus, in effect, the welding machine is travelling upon the very plate it is joining to the other shell plate of the tank. The flux carrier in such an instance must travel along the joint. The present invention provides a carrier which is driven by friction against the shell plate and temporarily holds the flux bed motionless with relation to the joint.

A preferred embodiment of apparatus embodying the present invention and capable of carrying out the method claimed is shown in the accompanying drawings in which:

Figure 2 is an enlarged fragmentary front elevational view of the flux carrier mounted on the machine illustrated in Figure 1;

Figure 3 is a fragmentary sectional view taken through the flux carrier substantially along line 3—3 in Figure 2;

Figure 4 is a fragmentary enlarged view looking toward the plate contacting portion of the rollers supporting the flux carrying belt; and Figure 5 is a fragmentary sectional view taken through the edge portion of the roller illustrated in Figure 4.

Figure 1:
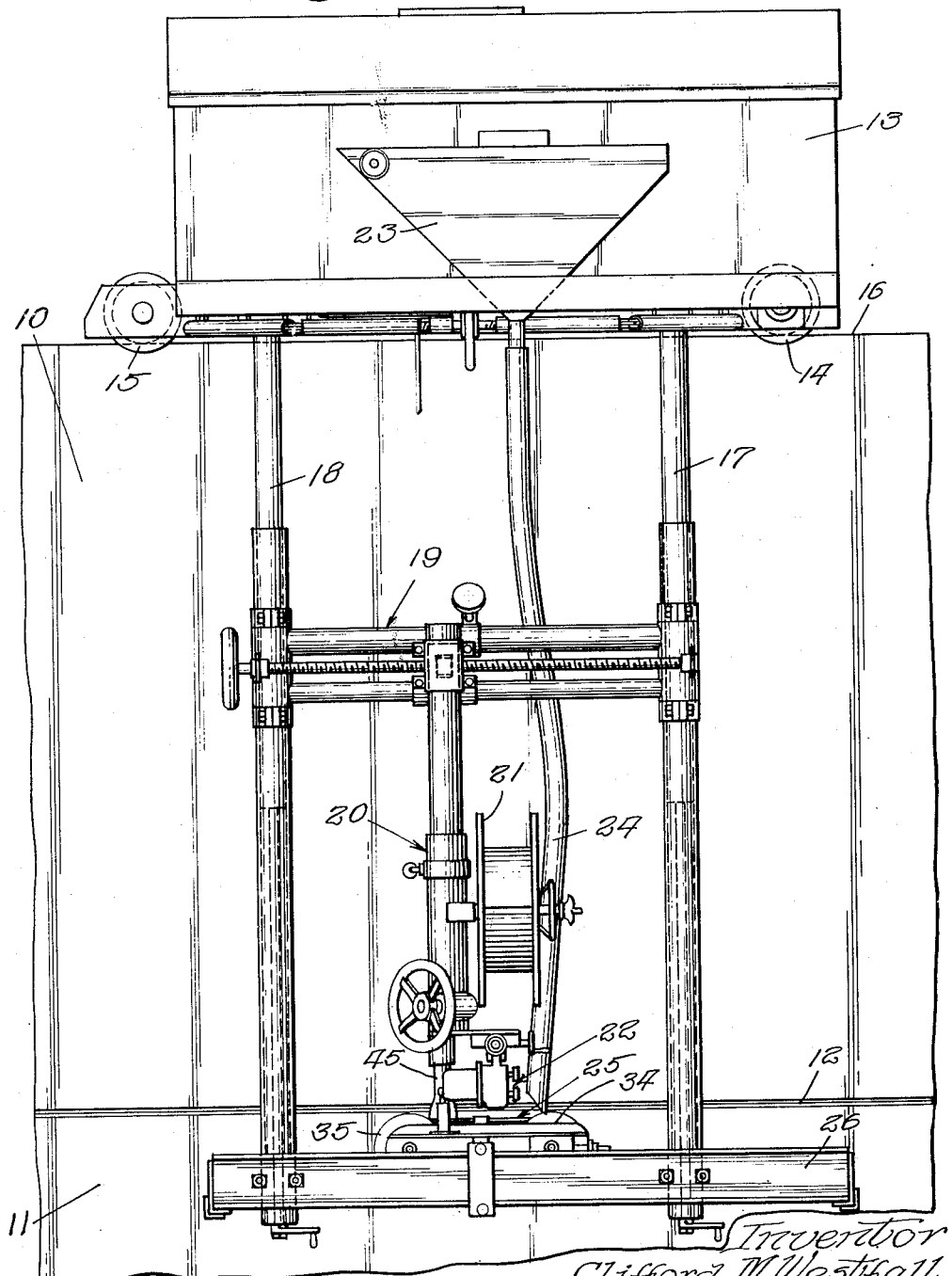
Figure 1 is a side elevational view of one side of a welding machine mounted upon the plates of a liquid storage tank and in position to weld a horizontal girth joint.

A granular flux has been supported against a horizontal joint by an endless belt mounted on rollers so that the upper run of the belt could theoretically be held stationary with relation to the shell plates. Some difficulty has been encountered with the arrangement since any slippage of the rollers on the shell plates would move the whole layer of flux longitudinally of the joint and, in effect, drag any molten weld metal in the joint longitudinally thereof.

In instances where the rollers supporting the belt were mechanically driven, correlation of the speed of the belt and the speed of the welding machine proper has caused difficulty in obtaining sound and continuous weld beads. Attempts have been made to drive the belt by friction between relatively smooth faced rollers and the plates. Rubber edged rollers have been used for this problem as well as knurled metal rollers. These, too, have been unsatisfactory, particularly where the surfaces of the plates against which they are rolling have either dirt, rust or other irregularities over which the rollers must travel.

The edges of the plates forming the weld joint are usually carefully sheared however handling and exposure to weather may cause some plate surface irregularities in the area over which the rollers must contact and gain the driving force for the flux belt. In the present invention these difficulties have been overcome by, in effect, providing a more positive drive for the flux carrier.

Referring particularly to Figure 1 of the drawings, a shell plate 10 is shown as mounted above a lower shell plate 11 so that the girth joint 12 between the plates may be temporarily held in position until filled with weld metal by the method of welding to be described. The welding machine itself has a chassis covered by a hood 13 and is provided with wheels 14 and 15 mounted in tandem and grooved to ride on the upper edge 16 of the plate 10. The structure of the chassis and wheels along with the drive power motor is illustrated and claimed in my copending application filed jointly with William A. Davis Serial No. 388,394 filed October 26, 1953.

A depending framework including a pair of posts 17 and 18 supports cross guide bars generally indicated at 19 upon which a welding head mount 20 is adjustably secured to hold a reel 21 which supports welding wire fed therefrom by a welding head 22 to the joint 12. Flux is supplied from a hopper 23 through a gravity hose drain 24 to the operative run 25 of a flux supporting belt. The flux carrier is supported on a channel member 26 which, in turn, is secured to the posts 17 and 18 so that it may receive flux covering the joint just ahead of the arc between the welding wire and plates. Thus, the arc will be submerged in the flux. The particular welding head mount is shown in my copending application Serial No. 389,061 filed October 29, 1953.

As illustrated in Figures 2 through 5, the flux support is secured to the channel 26 by means of a clamp plate 27 secured by bolts 28 to a bracket 29 having an apertured lug 30 for receiving a pin 31 to secure a clevis 32 supporting back plate 33 forming the framework for the rollers 34 and 35. The roller 34 is adjustably mounted in the framework 33 so that a take up screw 36 may move the roller 34 with relation to the roller 35. The belt 37 passes around the rollers and is formed of a flexible tough belt material capable of withstanding high temperatures. Sufficient tension is placed on the belt 37 to hold it tautly about the rollers and the belt has sufficient width to practically extend over the width of the cylindrical rollers.

In order to hold the layer of flux stationary and virtually immovable with relation to the girth joint, the flux must be deposited on the run 25 of the belt and thereafter not move relative to the joint until the weld metal under the flux has frozen to the adjoining plates. The operative run 25 of the belt is prevented from sagging by a support plate 38 mounted beneath the run 25 of the belt and secured by an angle 39 to the framework 33. To insure that the run 25 is held tautly against the plate 11 a pusher mechanism 40 including screw members 41 and a pusher bar 42 may be tightened against the outer edge of the belt to force it inwardly against the plate regardless of the curvature or plate surface irregularities. This mechanism is also supported by means of brackets 43 on the framework 33. Guide rods 44 may be provided for maintaining the pusher bar 42 in position against the outer edge of the run 25 of the belt. Flux may be provided through gravity flow pipe 24 as described and unused flux may be picked up by a vacuum inlet pipe 45 supported on the framework of the flux carrier.

As has been noted above, a considerable amount of difficulty has been experienced in getting the belt to maintain its flux supporting run 25 stationary with relation to the plate 11. This difficulty has been overcome by the provision of a serrated or toothed peripheral edge on the rollers which contact the plate. It will be noted in Figures 3 through 5, that a ring 46 has an outer diameter equal to the diameter of the roller 34 or 35 and is secured to the plate contacting surface by a number of screws 47. The outer edge portion of the ring is formed with gear-like teeth 48. These teeth extend radially and are cut so that the crests 49 are normal to the axis of the roller. In this manner, the outer point 50 of these teeth si directed against the plate when the rollers are tilted with relation to the plate as illustrated in Figure 3. It is preferred to harden the ring so that the teeth are considerably harder than the metal forming the shell plates 10 and 11. As an example of the number of teeth used, a ring $5^{15}/_{16}$ inches in diameter may be milled with 92 teeth with sharp corners. The teeth will have a depth of approximately .101 inch and a radial width of about $3/_{16}$ inch.

The framework posts 17 and 18 of the welding machine are provided on each side so that both sides of the joint may be welded at one time. One framework is hinged to the chassis so that the lower ends may be forcibly urged against the plates by their own weight inasmuch as the framework is hinged at its upper end and the welding head is positioned upon the lower end of posts 17 and 18. Furthermore, this effect of gravity may be suplemented by any suitable means such as springs as described in the copending application Serial No. 131,223, filed December 5, 1949, by Perry C. Arnold or as described in my copending application Serial No. 389,061, filed October 29, 1953. The pressure used is sufficient to cause the points 50 of the teeth on the roller to actually dig into the plate 11 in an amount sufficient to leave a readily visible track. The points of successive teeth dig into the plate irrespective of plate surface irregularities, dirt, scale or the like. At the same time, the driving force is concentrated on the roller at a point farthest from its center of rotation. All of the force is concentrated at the periphery of the roller and adjacent the belt at the point of greatest driving force. The greatest force possible is thus provided for causing the roller to rotate and thus maintain the run 25 of the belt stationary with relation to the shell or plate 11. No longitudinal slipping of the belt can thus occur as the tension placed on the belt by the rollers will cause the belt to roll with the rollers as they travel around the seam so that the belt in so rolling remains stationary with respect to the plate.

It has been found that the method of welding herein described in conjunction with the preferred apparatus will produce sound welds without defects caused by shifting of the flux layer against the joint. By maintaining the layer of flux motionless with respect to the joint, a sound weld may be made and the bead will not have faults due to shifting as has heretofore been the case.

The foregoing detailed description has been given for clearness of understanding only, and no unnecessary limitations should be understood therefrom, for some modifications will be obvious to those skilled in the art.

I claim:

1. Welding apparatus for use on a generally horizontal joint between upright plates, comprising, a pair of rollers having their peripheral surfaces inclined to the plate and having a peripheral edge in contact with the plate, a flexible endless belt mounted tautly around the rollers and having one run thereof in contact with the plate for simultaneous movement of the belt with rotation of the rollers and relatively stationary contact between the contacting run of the belt and the plate, a toothed face on said peripheral edge of each roller having pointed portions successively contacting and penetrating the surface of the plate, whereby the force for rotating said rollers is applied at the periphery of the roller, means for feeding flux and welding wire to the joint just above the belt, and means for traversing the belt along the plate.

2. A welding apparatus as specified in claim 1 wherein the toothed faces on the peripheral edges of said rollers are forced into penetrating contact with said plate.

3. Welding apparatus as specified in claim 1 wherein each roller is provided with a ring secured to the plate contacting periphery of the roller, each ring having teeth inclined to the plate to present a pointed corner for engaging and penetrating the surface of the plate.

4. Welding apparatus as specified in claim 1 wherein the teeth on each roller have a hardness substantially in excess of the plate hardness.

5. Welding apparatus as specified in claim 3 wherein the teeth of the ring are of hardened steel and laterally spaced to permit each tooth to partially penetrate the surface of the plate.

6. Welding apparatus for use on a generally horizontal joint between upright plates, comprising, a chassis, a frame depending therefrom, a pair of rollers carried by the lower end of said frame and a continuous flexible belt around said rollers so as to be driven thereby, said rollers holding a run of said belt continuously against the plate below the joint to be welded, said rollers being in position to engage the plate, teeth on the plate contacting periphery of each roller arranged with their crests inclined to the plate to present sharp plate contacting corners penetrating the surface of said plate for positively driving said rollers and maintaining portions of said belt stationary relatively to the plate during movement along the plate.

References Cited in the file of this patent

UNITED STATES PATENTS

| | | |
|---|---|---|
| 2,529,812 | Peters | Nov. 14, 1950 |
| 2,638,524 | Meyer | May 12, 1953 |